May 17, 1927.
J. C TRULOVE
1,629,422
TOBACCO HARVESTER
Filed Oct. 20, 1924
2 Sheets-Sheet 1
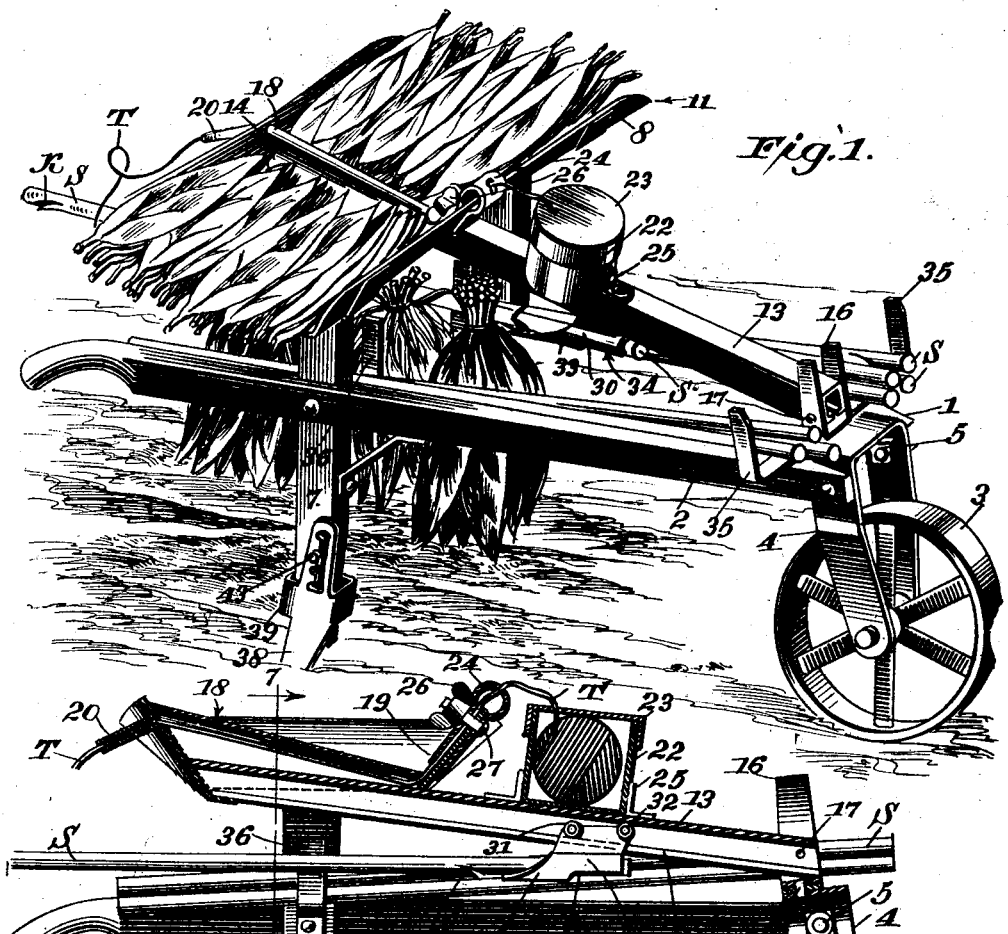
WITNESSES
J. T. Schrott
INVENTOR
John C. Trulove.
BY
ATTORNEYS May 17, 1927. 1,629,422
J. C. TRULOVE
TOBACCO HARVESTER
Filed Oct. 20, 1924   2 Sheets-Sheet 2
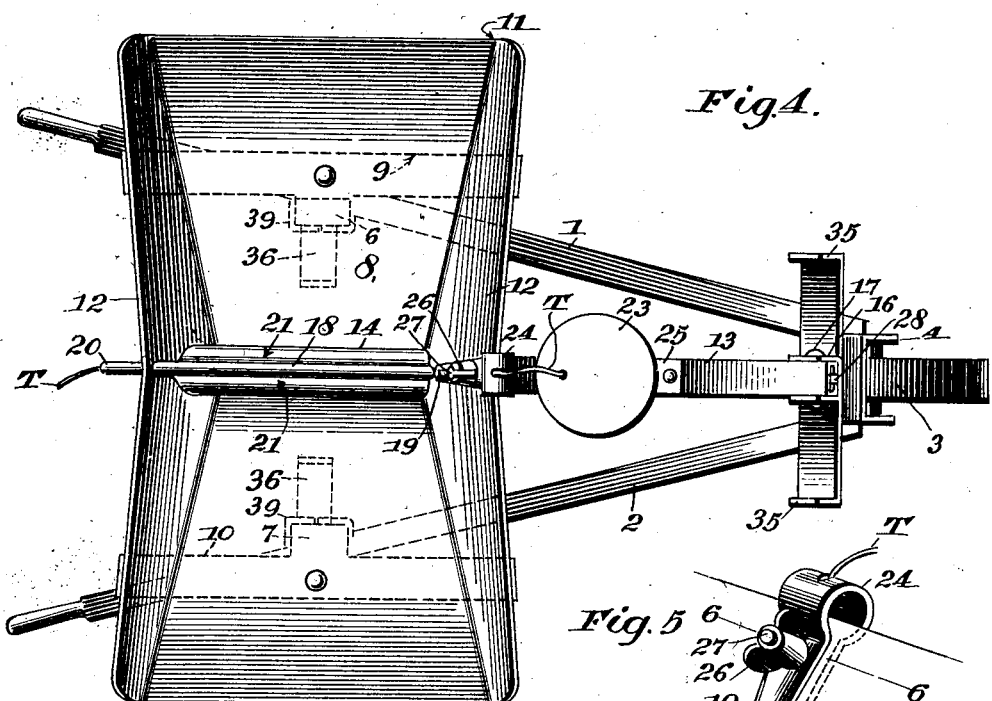
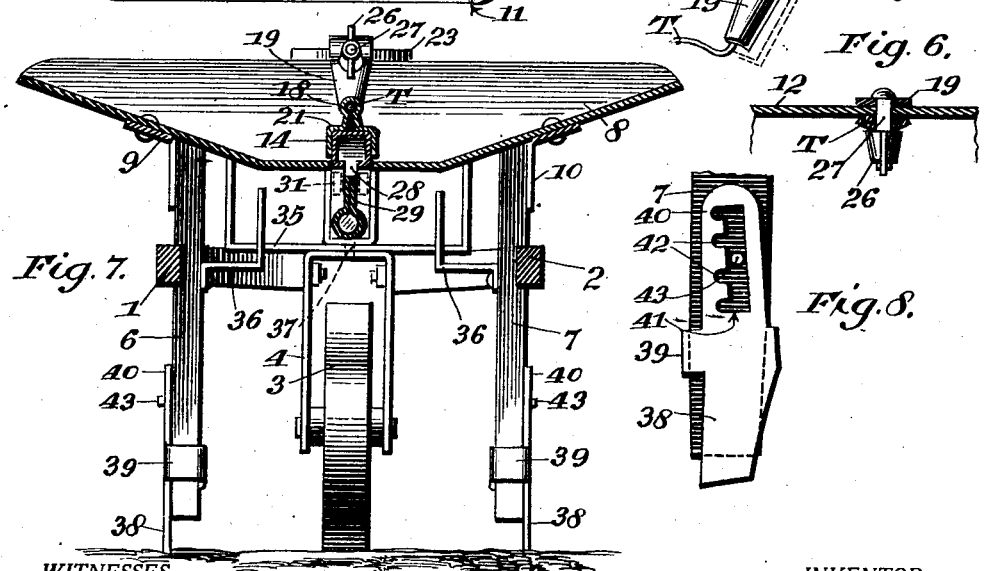
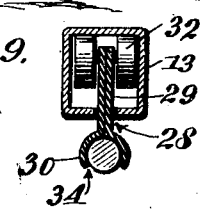
WITNESSES
J. P. Schrott
INVENTOR
John C. Trulove
BY
ATTORNEYS Patented May 17, 1927.

1,629,422

UNITED STATES PATENT OFFICE.

JOHN C. TRULOVE, OF SHOALS, NORTH CAROLINA.

TOBACCO HARVESTER.

Application filed October 20, 1924. Serial No. 744,725.

This invention relates to improvements in tobacco harvesters, and it consists of the constructions, combinations and arrangements herein described and claimed.

An object of the invention is to provide an implement by the use of which the harvesting of tobacco leaves is not only facilitated, but unnecessary handling thereof is eliminated also.

Another object of the invention is to make it possible to harvest the tobacco with the same amount of labor as is required to plant and produce it.

A further object of the invention is to provide an implement by the use of which it is possible to transfer the tobacco leaves to the drying sticks almost immediately upon harvesting them, thereby avoiding bruising the leaves by virtue of excessive handling.

Other objects and advantages appear in the following specification, reference being had to the accompanying drawings in which:

Figure 1 is a perspective view of the improved harvesting implement illustrating it as in use, Figure 2 is a longitudinal section thereof, Figure 3 is a detail sectional view of the stick carrier, Figure 4 is a plan view of the implement, Figure 5 is a detail perspective view of the thread tensioning clip, Figure 6 is a detail cross section on the line 6—6 of Figure 5, Figure 7 is a cross section on the line 7—7 of Figure 2, Figure 8 is a detail side elevation of one of the adjustable legs, Figure 9 is a detail cross section on the line 9—9 of Figure 3.

In its general aspects the harvesting implement appears like an ordinary wheelbarrow in that it consists of a frame having handles 1 and 2 which diverge from the single wheel 3 at the front. This wheel has bearing in a bracket 4 to which the handles are suitably affixed as, for example, by means of bolts 5.

The legs 6 and 7 also suggest those of the ordinary wheelbarrow, but unlike such wheelbarrow extend considerably above the handles 1 and 2, so as to support the trough 8 quite high from the ground. The last is a relative term and is intended to make a comparison of the height of the trough of the ordinary wheelbarrow. The trough 8 is elevated to such position at which the operators can most readily place the tobacco leaves without much unnecessary bending.

Angle brackets 9 and 10 support the trough 8 upon the upper ends of the legs 6 and 7 (Figure 7). The sides of the trough are flared at 11, as clearly shown in Figure 4, and the ends 12 are so shaped that the trough deepens in the center. These arrangements provide inclined containers, as it were, in which the tobacco leaves will readily remain when once placed as in Figure 1.

The trough 8 is centrally and longitudinally divided partly by the rear end of the channel rail 13 and by the thread guide 14 which is removably seated thereupon. The channel rail inclines downward and forward where it extends between uprights 16 (Figure 1) to which it is permanently secured by suitable means as rivets 17. The rear or upper end of the rail is secured to the trough 8 in any suitable manner (not shown).

A circular channel 18 guides the thread T across the trough 8 from its place of entrance at the tension clip 19 to the place of exit at the thread spout 20. The guide 14 is bent down and outward at 21, thus producing shoulders which at the lowest end of the thread guide contact with the rail 13. The sides of the thread guide become wider toward the rear so that the rear end of the guide is considerably higher (Figures 1 and 2) than the front. This formation is necessary to bring the tension clip and spout into communication.

Mounted upon the rail 13 is a box 22 which contains a ball of thread. The thread passes through a hole in the cover 23 and then enters a hole in the head 24 of the tension clip. Brackets 25 offer means to secure the box 22 upon the rail 13.

In shape the tension clip 19 resembles a clothes pin. The underside is intended to be secured to the front end 12 of the trough 8. The upper side is free with the exception of the restraint which the wing nut 26 places thereon. This nut is threaded on a bolt 27 which passes completely through, and upon turning the nut regulation of the tension on the thread is accomplished.

Such tension regulation is necessary to insure the proper feeding of the thread T. It must be neither too tight nor loose. The clip 19 is convex in cross section (Figures 5 and 6) to thereby provide a channel or passageway through which the thread passes. The thread is used in tying the tobacco leaves in bunches upon sticks.

A slot 28 running full length of and on the bottom of the rail 13 provides a passage for the narrow part or web 29 of the stick carrier 30. This carrier has pairs 31 and 32 of rollers which run inside of the rail 13. These pairs of rollers respectively contact the interior bottom and top surfaces of the rail (Figures 2 and 3) when the weight of a stick S is imposed thereon.

For the purpose of holding the tobacco stick S the rear end extends away from the web 29 to provide what might be called a circular shelf 33. The front end is so cut away at 34 as to produce a crotch. One end of a tobacco stick is inserted in the carrier 30 whereupon its weight holds it in the intended horizontal position. The carrier is rolled rearwardly in the rail 13 as it becomes filled with tobacco by merely pulling on the stick. By using a little care the stick will not come out of the carrier.

A supply of sticks is carried by the harvester, brackets 35 at the front and 36 serving to hold them where they can readily be reached when needed. The uprights 16 and brackets 35 may be fastened down upon the wheel bracket 4 by common securing means as a rivet 37 (Figures 2 and 7).

Raising and lowering of the trough 8 to convenient working heights is accomplished by adjusting the feet 38 in respect to the legs 1 and 2. Each of these feet has a band 39 which embraces or fits around the leg, and a plate 40 having a slot 41 with a plurality of lateral recesses 42 on the side next to the rear. A pin 43 occupies the slot 41, and the foot can be moved so as to let any desired one of the recesses receive the pin. The disposition of the foot upon the leg is such that the pin remains in position, such position being insured when the weight of the implement is added as shown in Figure 2.

*The operation.*

The implement is transported between the plant rows of the tobacco field much on the order that one may push a wheelbarrow. Two operators accompany the implement and the person who pushes it, one on each side.

As bunches of tobacco leaves are accumulated by the pickers they are laid into the trough 8 somewhat in the manner shown in Figure 1. The central operator or pusher inserts a tobacco stick S into the carrier 30 and pulls the carrier as far rearward along the channel rail 13 as need be. The end 12 of the trough limits the movement of the carrier.

Each stick has a knife cut K at opposite ends. The thread T is now pulled down from the spout 20 until one end can be caught in that cut nearest the carrier. The pusher sets the implement down at such intervals that a good supply of leaves has accumulated in the trough, and taking a bunch of leaves makes a loop in the thread and ties the bunch together at the stalk end. The thread is wound around the stick several times and the operation is repeated.

The result is that numerous bunches are suspended from the stick S, the carrier 30 being moved forward a little with the tying of each bunch so that there may be room for the next bunch. Upon tying the last bunch the thread is caught in the last slot or cut K and then broken. The filled stick S is then removed from the carrier 30 by exerting a slight upward pressure and a fresh one substituted. A little pressure upon the stick and a rearward pull brings the carrier in the starting position on the rail B. The filled stick is placed on a sled or truck and conveyed to a barn. The implement is now transported between the rows to the next handiest place where it is set down and the foregoing operations are repeated.

It is desired to say at this time that the implement may be operated by power other than manual. Upon making the implement on a larger scale, to accommodate large tobacco growers, it is contemplated to make it horse drawn. It is believed that any necessary conversion to accomplish this end is quite obvious without requiring specific illustration.

The use of this implement makes it possible for one man to bunch and loop the tobacco leaves on sticks on the field without the aid of two men as usual. By looping the tobacco on the field instead of first hauling it to the barn avoids the common trouble of tangling.

While the construction and arrangement of the improved tobacco harvester as herein described is that of a generally preferred form, obviously modifications and changes may be made without departing from the spirit of the invention or scope of the claims.

I claim:—

1. An implement of the character described, comprising a wheeled frame including handles, legs carried by the frame extending above said handles, a trough for receiving tobacco leaves being mounted on top of said legs to space the trough above the handles, and means for supporting a stick beneath the trough and between the handles in a position to permit tying tobacco leaf bunches thereon.

2. An implement of the character described, comprising a wheeled frame, a trough carried thereby for receiving tobacco leaves, means for supporting a stick in a position to permit tying tobacco leaf bunches thereon, and means upon which said supporting means is movable permitting pushing the stick forward as it becomes filled.

3. An implement of the character described, comprising a wheeled frame, a trough carried thereby for receiving tobacco leaves, means including a wheeled carrier for supporting the stick in a position to permit tying tobacco leaf bunches thereon, and means including a channel rail upon which the carrier may ride permitting pushing the stick forward or pulling it rearward as may be needed.

4. A portable farm implement, comprising a wheeled frame, a trough for holding a supply of tobacco leaves placed thereupon as the implement is moved along, a central rail extending under the trough, a carrier movable along the rail, means providing a support for a supply of sticks to be individually inserted in the carrier in position to permit tying the leaves thereon in bunches, means including a box containing a supply of thread for tying the bunches, an adjustable clip carried by the trough imposing pressure on the thread, a guide through which the thread passes upon leaving the clip, and a spout at which the thread hangs in position for tying.

5. An implement of the character described, comprising a wheeled frame, a trough for carrying tobacco leaves mounted on the frame, said trough slanting upward from the longitudinal center and being flared to more readily hold the leaves, there being ends shaped to fit the trough, and means forming a partition along said longitudinal center, said means including a thread guide.

6. An implement of the character described comprising a wheeled frame including handles, legs carried by the frame extending above the handles, a trough for receiving tobacco leaves being mounted on top of said legs to space the trough above the handles, means for supporting a stick beneath the trough and in position to permit tying the tobacco leaves in bunches thereon, feet consisting of slotted and recessed plates carried by the legs, said feet having bands holding them in place on the legs, and pins on the legs occupying the slots being fitted in desired ones of the recesses to support the trough at various altitudes when the implement is set down.

JOHN C. TRULOVE.